(12) United States Patent  (10) Patent No.: US 8,810,707 B2
Tsujii  (45) Date of Patent: Aug. 19, 2014

(54) IMAGE PICKUP APPARATUS HAVING OPENABLE AND CLOSABLE DISPLAY PANEL, CONTROL METHOD THEREFOR, AND STORAGE MEDIUM

(75) Inventor: Hideaki Tsujii, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 13/156,887

(22) Filed: Jun. 9, 2011

(65) Prior Publication Data

US 2011/0310284 A1  Dec. 22, 2011

(30) Foreign Application Priority Data

Jun. 22, 2010 (JP) ................. 2010-141513

(51) Int. Cl.
*H04N 5/222* (2006.01)
*H04N 5/225* (2006.01)
*G03B 13/02* (2006.01)
*H04N 5/232* (2006.01)

(52) U.S. Cl.
CPC ....... *H04N 5/23293* (2013.01); *H04N 5/23216* (2013.01)
USPC ................. 348/333.01; 348/333.06; 348/373; 396/374

(58) Field of Classification Search
CPC ................................................ H04N 5/23293
USPC .......... 348/211.4, 211.5, 211.6, 211.7, 211.8, 348/211.9, 211.11, 211.13, 333.01, 333.02, 348/333.03, 333.04, 333.05, 333.06, 348/333.07, 333.11, 333.12, 333.13, 372, 348/373, 374, 375, 376; 396/373, 374
See application file for complete search history.

(56) References Cited

U.S. PATENT DOCUMENTS

| | | | | |
|---|---|---|---|---|
| 6,067,116 | A * | 5/2000 | Yamano et al. | 348/372 |
| 6,518,956 | B1 * | 2/2003 | Sato | 345/173 |
| 2002/0130962 | A1 * | 9/2002 | Senda | 348/333.06 |
| 2006/0227235 | A1 * | 10/2006 | Miura | 348/333.01 |
| 2007/0140665 | A1 * | 6/2007 | Shibata | 386/118 |

FOREIGN PATENT DOCUMENTS

| | | |
|---|---|---|
| JP | 2001-100270 | 4/2001 |
| JP | 2006-156116 | 6/2006 |

* cited by examiner

*Primary Examiner* — Twyler Haskins
*Assistant Examiner* — Peter Chon
(74) *Attorney, Agent, or Firm* — Cowan, Liebowitz & Latman, P.C.

(57) ABSTRACT

An image pickup apparatus which is capable of preventing shooting from ending in failure even when a display panel is unexpectedly closed under the influence of a strong wind, a water stream, or the like. Any shooting mode is selected from among a plurality of shooting modes including at least a first shooting mode and a second shooting mode. During taking of moving images in the first shooting mode, the taking of the moving images is stopped when a detection unit detects a display unit being in a closed position with respect to a main body of the image pickup apparatus, and during taking of moving images in the second shooting mode, the taking of the moving images is continued when the detection unit detects the display unit being in the closed position with respect to the main body.

11 Claims, 7 Drawing Sheets

IMAGE PICKUP APPARATUS HAVING OPENABLE AND CLOSABLE DISPLAY PANEL, CONTROL METHOD THEREFOR, AND STORAGE MEDIUM

BACKGROUND OF THE INVENTION

1. Field of the Invention

The present invention relates to an image pickup apparatus having an openable and closable display panel, a control method therefor, and a computer-readable storage medium storing a program for implementing the control method.

2. Description of the Related Art

A camera or video camera whose case is rendered waterproof (hereafter referred to as the "waterproof camera") so as to prevent water from entering an interior of the camera has been commercialized. Because the waterproof camera itself does not have to be covered with a special housing (waterproof case), input operations on operation keys are not limited (operability is not impaired), and because accidental submersion in water can be prevented, the waterproof camera is particularly suitable for outdoor use.

The waterproof camera is used on water or in water in many scenes, and hence operation keys may be unexpectedly depressed under the influence of a water stream or water pressure. To address this, there has been proposed a technique that, when a pushbutton switch for use only on water has been continuously depressed for a predetermined time period or longer, determines that this is an erroneous operation, and disables operation inputs (see, for example, Japanese Laid-Open Patent Publication (Kokai) No. 2001-100270). Also, there has been proposed a pushbutton switch having a mechanical structure that cancels water pressure applied to the pushbutton switch according to water pressure (see, for example, Japanese Laid-Open Patent Publication (Kokai) No. 2006-156116).

A video camera is generally provided with an openable and closable display panel (such as an LCD panel) as well as a pushbutton switch as described above, and opening and closing of the display panel is used as a switch. For example, it has been known that when closing of the display panel is detected, shooting is terminated, and the video camera is switched into a standby mode.

Because the area of a display panel is larger than that of a pushbutton switch, the display panel is susceptible to water streams and wind. Thus, for example, under the influence of a strong wind or wind gust at any usage location, or under the influence of a water stream such as unexpectedly becoming covered with a wave during use near water, the display panel may be closed, causing shooting to be unintentionally terminated to end in failure.

SUMMARY OF THE INVENTION

The present invention provides an image pickup apparatus capable of preventing shooting from ending in failure even when a display panel is unexpectedly closed under the influence of a strong wind, a water stream, or the like, a control method for the image pickup apparatus, and a computer-readable storage medium storing a program for implementing the control method.

Accordingly, a first aspect of the present invention provides An image pickup apparatus comprising an image pickup unit, a display unit configured to comprise a display having a display surface, and be mounted on a main body of the image pickup apparatus in such a manner as to be openable and closable, a detection unit configured to detect a position of the display unit with respect to the main body, a shooting mode setting unit configured to set any shooting mode from among a plurality of shooting modes including at least a first shooting mode and a second shooting mode, and a control unit configured to provide control to, during taking of moving images in the first shooting mode, stop the taking of the moving images when the detection unit detects the display unit being in a closed position with respect to the main body, and during taking of moving images in the second shooting mode, continue the taking of the moving images when the detection unit detects the display unit being in the closed position with respect to the main body.

Accordingly, a second aspect of the present invention provides a control method for an image pickup apparatus having an image pickup unit, a display unit that has a display having a display surface and is mounted on a main body of the image pickup apparatus in such a manner as to be openable and closable, and a detection unit that detects a position of the display unit with respect to the main body, comprising a shooting mode setting step of setting any shooting mode from among a plurality of shooting modes including at least a first shooting mode and a second shooting mode, and a control step of providing control to, during taking of moving images in the first shooting mode, stop the taking of the moving images when the detection unit detects the display unit being in a closed position with respect to the main body, and during taking of moving images in the second shooting mode, continue the taking of the moving images when the detection unit detects the display unit being in the closed position with respect to the main body.

Accordingly, a third aspect of the present invention provides a non-transitory computer-readable storage medium storing a program for implementing a control method for an image pickup apparatus having an image pickup unit, a display unit that has a display with a display surface and is mounted on a main body of the image pickup apparatus in such a manner as to be openable and closable, and a detection unit that detects a position of the display unit with respect to the main body, the method comprising a shooting mode setting step of setting any shooting mode from among a plurality of shooting modes including at least a first shooting mode and a second shooting mode, and a control step of providing control to, during taking of moving images in the first shooting mode, stop the taking of the moving images when the detection unit detects the display unit being in a closed position with respect to the main body, and during taking of moving images in the second shooting mode, continue the taking of the moving images when the detection unit detects the display unit being in the closed position with respect to the main body.

According to the present invention, shooting can be prevented from ending in failure when a display panel is unexpectedly closed under the influence of a strong wind, a water stream, or the like.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof. Here, a description will be given of the present invention by taking a so-called digital video camera (hereafter abbreviated to the "DVC") as an exemplary image pickup apparatus.

Figure 1:
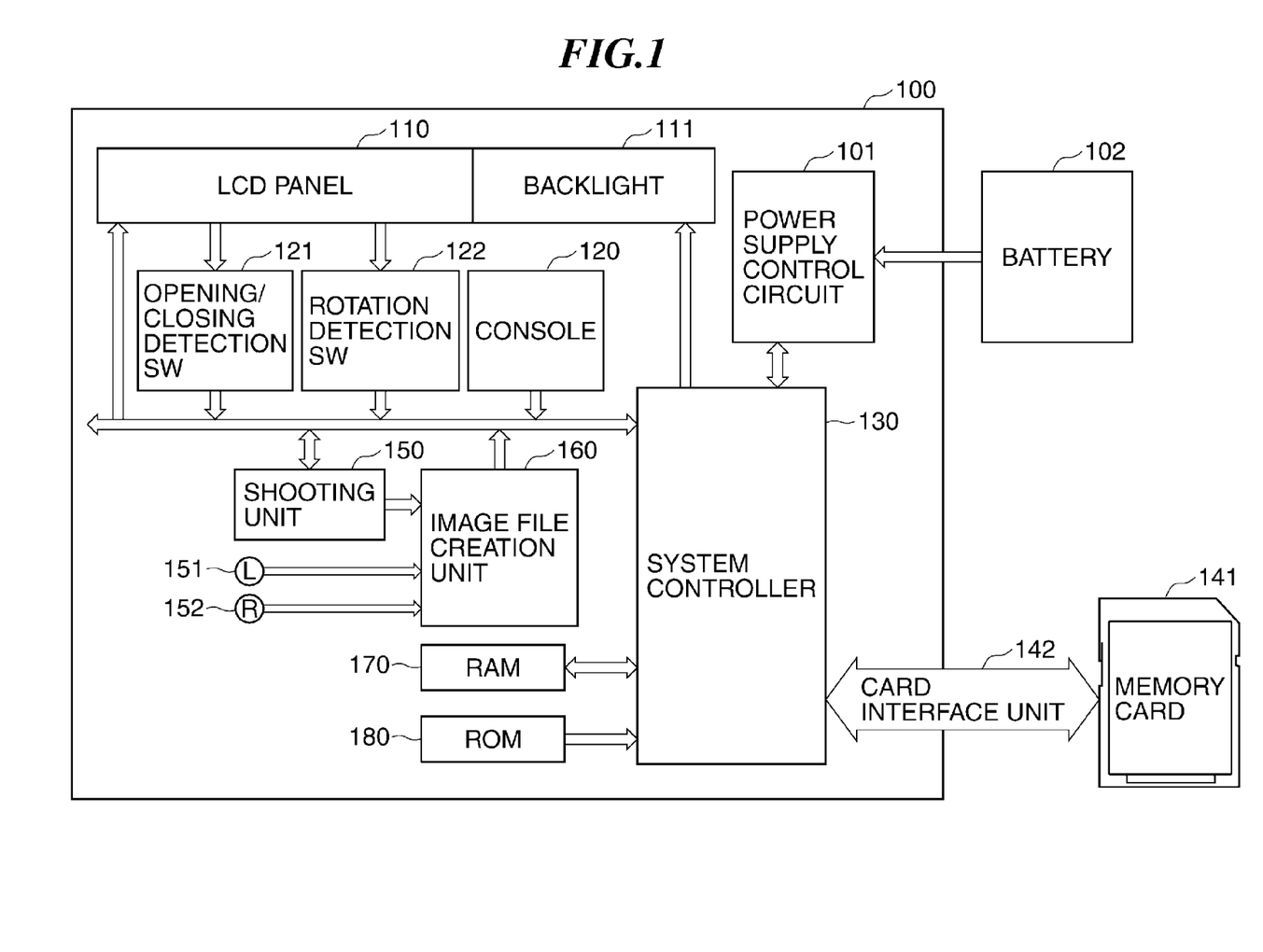
FIG. 1 is a block diagram schematically showing a hardware arrangement of a digital video camera according to an embodiment of the present invention.

FIG. 1 is a block diagram schematically showing a hardware arrangement of the DVC 100 according to an embodiment of the present invention. A system controller 130 is, for example, an MPU (micro processing unit), and includes peripheral circuits such as a processor core, an IO general purpose port, and an AD converter. Shooting control, storage control, display control, and so on are realized by the system controller 130 controlling components constituting the DVC 100 in accordance with input signals and programs. It should be noted that the entire DVC 100 may be controlled either by a single hardware piece, or by a plurality of hardware pieces sharing processing.

Connected to the system controller 130 are a RAM (random access memory) 170 which is an exemplary primary storage unit, and a ROM (read-only memory) 180 which is an exemplary secondary storage unit and in which programs to be executed by the system controller 130 are stored.

A shooting unit 150 which is an image pickup unit that takes a subject image includes a lens, an image sensor, motors for focus control and zoom control, and so on. The DVC 100 has a left-channel microphone 151 which is a first sound collector that converts a sound signal into an electric signal, and a right-channel microphone 152 which is a second sound collector that converts a sound signal into an electric signal. An image file creation unit 160 creates an image file including image data and sound data from a subject image obtained from the image pickup unit 150 and sound signals collected from the microphones 151 and 152 after shooting. Then, the system controller 130 writes the image filed created by the image file creation unit 160 into a memory card 141 via a card interface unit 142. It should be noted that the card interface unit 142 can input and output signals to and from the memory card 141 with prescribed timing. Also, the card interface unit 142 can control turning-on and off of power supply to the memory card 141.

The DVC 100 has an LCD panel 110 which is a panel display unit. The LCD panel 110 is capable of displaying various types of information treated by the he DVC 100, such as system information, various setting information such as a shooting mode, a subject image being taken, and a reproduced image of an image file stored in the memory card 141. Turning-on and off of the LCD panel 110 is controlled by the system controller 130 controlling turning-on and off of a backlight 111.

A console 120 receives instructions and others from a user so that operations instructed by the user can be realized. When the user operates the console 120, the console 120 having received the operation notifies the system controller 130 of the instruction from the user. The console 120 includes, for example, a shooting button, and when the shooting button is depressed once, taking and storage of moving images are started, and when the shooting button is depressed once again, the taking and storage of moving images are terminated. The console 120 displays a menu button, cross button, and a determination button for menu operations, and includes a touch panel input system that displays buttons on a screen of the LCD panel 110 and detects depressions of the displayed buttons.

Electrical power for driving the DVC 100 is supplied from a battery 102, and a power supply control circuit 101 detects an output voltage from the battery 102 and notifies the system controller 130 of the detected output voltage. When the DVC 100 is used outdoors, various types of primary batteries and secondary batteries are generally used as the battery 102.

Figure 2:
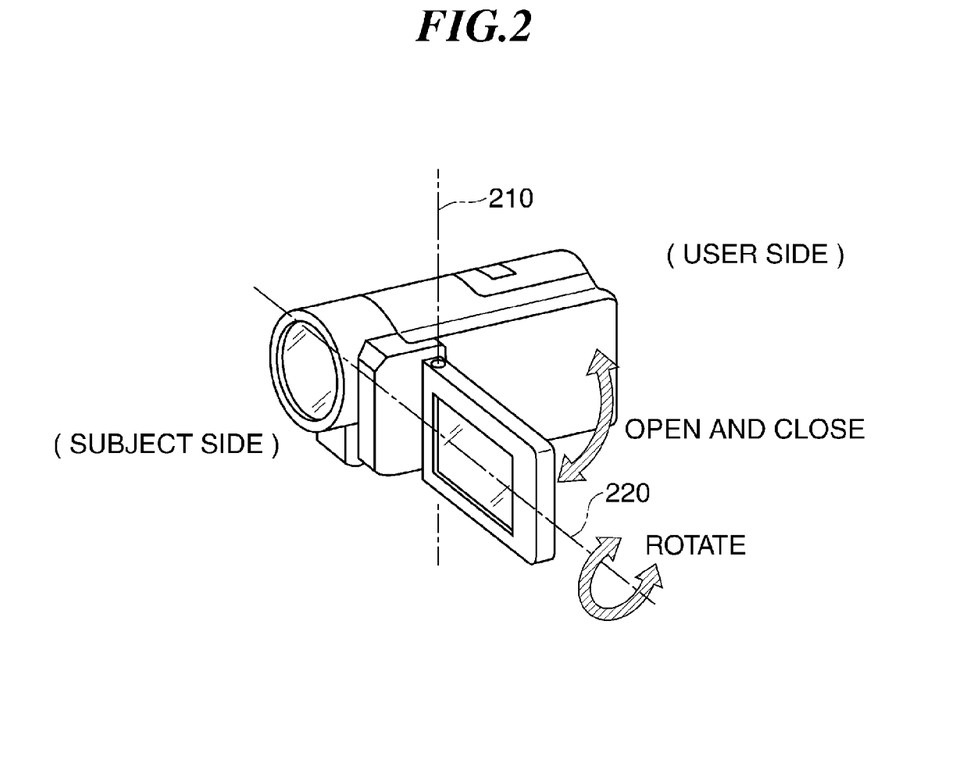
FIG. 2 is a perspective view showing a mechanical system of an LCD panel which the digital video camera in FIG. 1 has.

FIG. 2 is a perspective view showing a mechanical system of the LCD panel 110 which the DVC 100 has. The LCD panel 110 is biaxially mounted on a main body of the DVC 100, and is capable of being passively opened and closed and rotated by user's operations. A first axis 210 realizes an opening/closing mechanism, and the LCD panel 110 is convertible between two states, i.e., a "closed position" and an "opened position". The "closed position" means a position at which the LCD panel 110 is in substantially intimate contact with a side of the main body of the DVC 100, and a display surface of the LCD panel 110 is substantially parallel with the side of the main body of the DVC 100. On the other hand, the "opened position" means a position at which the display surface of the LCD panel 110 is substantially vertical to the side of the main body of the DVC 100.

A second axis 220 is parallel with the display surface of the LCD panel 110, and the LCD panel 110 is rotatable about the second axis 220. Thus, the LCD panel 110 can assume two states, i.e., a "facing position" in which the LCD panel 110 faces toward a subject during face-to-face shooting, and a "front-facing position" in which the LCD panel 110 faces toward the user (the opposite side of the subject). It should be noted that by rotating the LCD panel 110 about the first axis 210 into the "closed position", the display surface of the LCD panel 110 can be exposed to outside in a state where the LCD panel 110 is in substantially intimate contact with the side of the main body of DVD 100.

As shown in FIG. 1, the DVC 100 has an opening/closing detection switch 121 (not shown in FIG. 2) that detects an opening/closing state of the LCD panel 110, and a rotation detection switch 122 (not shown in FIG. 2) that detects a rotating state of the LCD panel 110. The system controller 130 reads states detected by the opening/closing detection switch 121 and the rotation detection switch 122, and determines whether or not the LCD panel 110 has been opened or closed and whether or not the LCD panel 110 has been rotated.

It should be noted that FIG. 2 shows a state where the LCD panel 110 is in the "opened position" and the "facing position". In general, for carrying or the like of the DVC 100, a state where the LCD panel 110 having being at the "front-facing position" is rotated about the first axis 210 into the "closed position" (that is, a state where the LCD panel 110 cannot be directly viewed) is used. For this reason, a mechanical lock may be provided in a state where the LCD panel 110 is in the "front-facing position" and the "closed position". In the first embodiment, at positions other than the "front-facing position" and the "closed position", no mechanical lock system is provided so that the LCD panel 110 can be smoothly moved.

The DVC 100 is configured to be capable of operating in three operation modes described hereafter. The first operation mode is a system-on mode (shooting power supply mode) in which all functions of the DVC 100 can be used. The second operation mode is a system-off mode in which the DVC 100 can be operated with minimum electrical power so as to perform a system timer operation for stepping time information, and a memory backup operation for holding system setting information. The third operation mode is a standby mode (power-saving mode) in which some of the functions are disabled so as to conserve power, and the DVC 100 can immediately return to the system-on mode.

It should be noted that in the standby mode, the backlight 111 is kept off. These modes can be set by operation of the console 120, and performed automatically according to shooting conditions by the system controller 130.

Figure 3A:
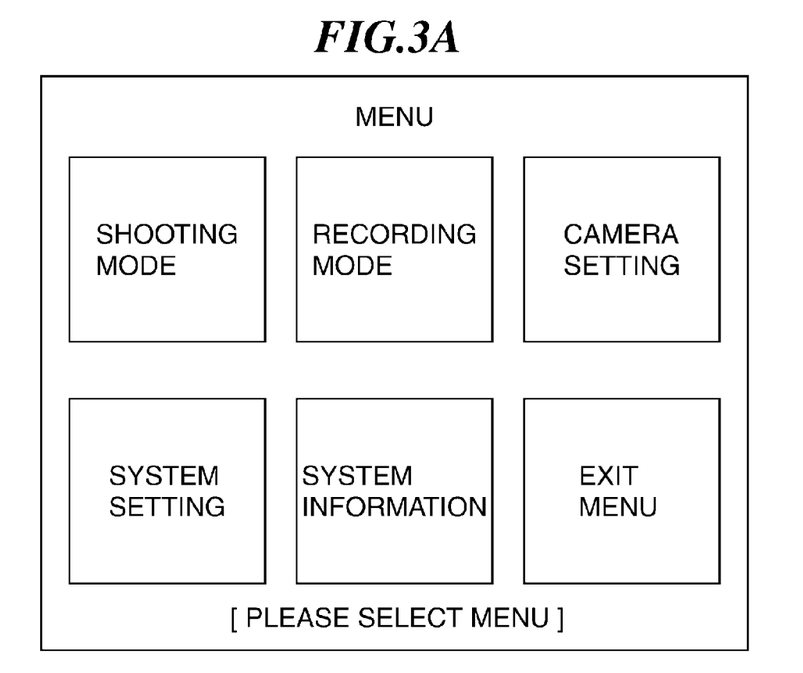
FIGS. 3A and 3B are views showing exemplary screen displays of user interfaces for setting a shooting mode in the digital video camera in FIG. 1.
Figure 3B:
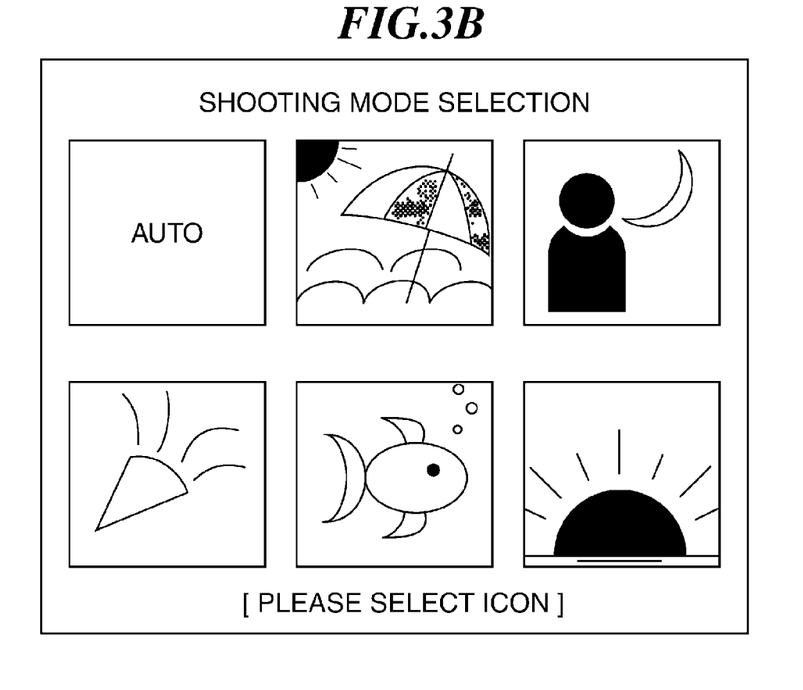

FIGS. 3A and 3B are views showing exemplary screen displays of user interfaces for setting a shooting mode in the DVC 100. When a menu button (not shown) on the console 120 is depressed, a menu screen shown in FIG. 3A is displayed on the LCD panel 110. When a "shooting mode" on a left-hand side in a first line is selected and determined from among various items shown in FIG. 3A, a shooting mode selection menu screen shown in FIG. 3B is displayed on the LCD panel 110.

The DVC 100 can be switched between at least a reproducing mode for reproducing images and shooting modes for taking pictures, and has as the shooting modes, an auto-mode (a left-hand side in a first line in FIG. 3B), a manual mode, and a plurality of scene-by-scene shooting modes. The scene-by-scene shooting modes are realized by combining shutter speed, f number, strobe light flashing condition, sensitivity setting, white balance (WB) setting, and so on suitable for each shooting scene. The DVC 100 has, for example, scene-by-scene shooting modes (1) to (10) described hereafter. The present invention, however, is not limited to these scene-by-scene shooting modes.

(1) An on-water shooting mode (beach mode): a mode in which picture can be taken without darkening a figure even on a surface of the sea or a sandy beach on which sunlight is strongly reflected (the middle of the first line in FIG. 3B)

(2) A night scene shooting mode: a specialized mode for night scenes in which a figure is irradiated with strobe light, and a background is recorded at low speed (a right-hand side in the first line in FIG. 3B)

(3) A firework shooting mode: a mode for taking vivid images of fireworks with optimum exposure (a left-hand side in a second line in FIG. 3B)

(4) An in-water shooting mode: a mode in which optimum white balance for taking underwater pictures is set, and pictures are taken in a bluish undertone (the middle of the second line in FIG. 3B)

(5) A sunset shooting mode: a mode in which a picture is taken by enhancing a silhouette, and enhancing red (a right-hand side in the second line in FIG. 3B)

(6) A portrait shooting mode: a specialized mode for taking people photographs in which a figure is isolated by throwing a background out of focus (not shown)

(7) A sport shooting mode: a shooting mode with specialized settings for taking images of subjects moving fast (8) A snow shooting mode: a mode in which a picture is taken without darkening a figure even with a snow scene in the background and without bluish coloring (not shown)

(9) A night-and-snap shooting mode: a mode suitable mode for taking clear pictures of a night scene and a figure without using a tripod (not shown)

(10) A spotlight shooting mode: a mode in which pictures of spotlighted subjects are clearly taken The user can set the DVC 100 in a desired shooting mode selected from the shooting mode selection menu, and take pictures.

It should be noted that on the menu screen in FIG. 3A, an icon of an item being selected is highlighted, and the user can select and determine a desired item by operating the cross button to move a selected mode and depressing an enter button. The same holds for the shooting mode selection menu screen in FIG. 3B. It should be noted that when the cross button is operated so as to move the selection downward with an icon in the second line in FIG. 3B selected, other shooting modes not shown in FIG. 3B among the scene-by-scene shooting modes appear.

When the "in-water shooting mode (first shooting mode)" in the middle of the second line in FIG. 3B is selected and determined, the shooting mode is set to the in-water shooting mode. In the present embodiment, when the user selects the in-water shooting mode, this is predicated on usage in an environment susceptible to water streams such as becoming covered with a wave. Also, when the user selects any shooting mode (hereafter referred to as the "non in-water shooting mode (second shooting mode)") other than the in-water shooting mode, this is predicated on usage in an environment which is not expected to be affected by water streams. However, processing in the in-water shooting mode described below may be applied to processing in the on-water shooting mode in which usage near water is expected.

Figure 4A:
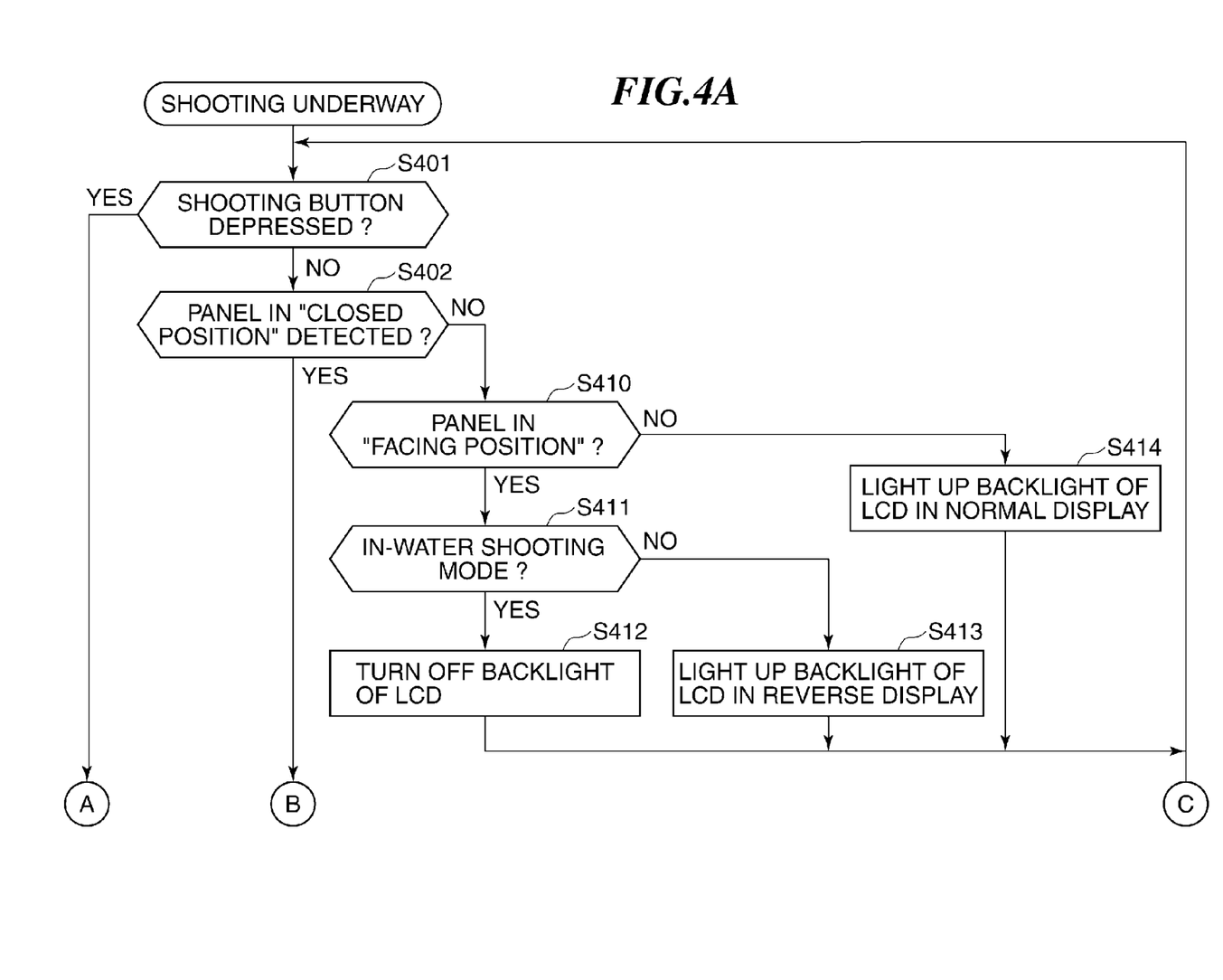
FIGS. 4A and 4B are flowcharts of operation control according to a first embodiment which is performed in the digital video camera in FIG. 1.
Figure 4B:
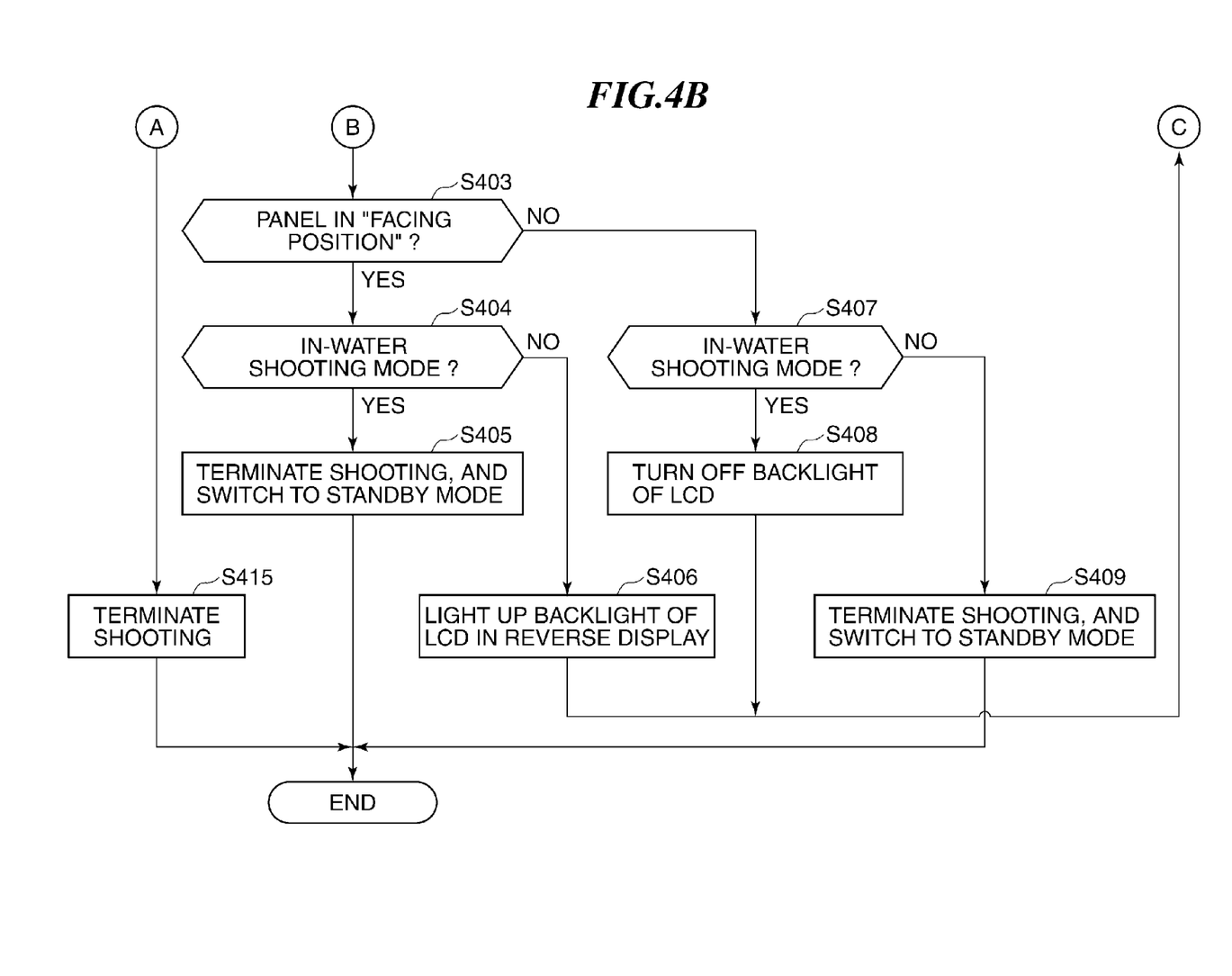

FIGS. 4A and 4B are flowcharts of operation control according to a first embodiment which is performed in the DVC 100 in FIG. 1. The operation control is realized by the system controller 130 controlling components of the DVC 100 in accordance with a state of the LCD panel 110 during shooting, which is detected by the opening/closing detection switch 121 and the rotation detection switch 122, as well as a shooting mode.

First, it is determined whether or not a shooting button has been depressed during shooting the DVC 100 (step S401). When depression of the shooting button has been detected ("YES" in the step S401), this is determined as being a shooting terminating operation, and shooting is terminated (step S415). When depression of the shooting button is not detected ("NO" in the step S401), it is determined whether or not the opening/closing detection switch 121 has detected that the LCD panel 110 had been brought into the "closed position" (step S402).

When the "closed position" has not been detected, that is, when the LCD panel 110 is in the opened position ("NO" in the step S402), the state of the rotation detection switch 122 is checked to determine whether or not the LCD panel 110 is in the "facing position" (step S410). When the LCD panel 110 is not in the "facing position", that is, when the LCD panel 110 is in the "front-facing position" ("NO" in the step S410), the backlight 111 is lighted up in normal display (step S414), and then the process returns to the step S401. On the other hand, when the LCD panel 110 is in the "facing position" ("YES" in the step S410), it is determined whether or not the shooting mode is the in-water shooting mode (step S411).

When the shooting mode is the in-water shooting mode ("YES" in the step S411), the backlight 111 of the LCD panel 110 is turned off (step S412), and then the process returns to the step S401. When the shooting mode is not the in-water shooting mode ("NO" in the step S411), a shot image is mirror-reversed with respect to a subject, and the backlight 111 is lighted up (step S413). Then, the process returns the step S401.

When the "closed position" is detected in the step S402 (the determination result is "YES"), the state of the rotation detection switch 122 is checked to determine whether or not the LCD panel 110 is in the "facing position" (step S403).

When the LCD panel 110 is in the "facing position" ("YES" in the step S403), it is determined whether or not the shooting mode is the in-water shooting mode (step S404). When the shooting mode is the in-water shooting mode ("YES" in the step S404), shooting is terminated, and the shooting mode is switched into the standby mode which is the third operation mode (step S405). On the other hand, when the shooting mode is not the in-water shooting mode, that is, when the shooting mode is a non in-water shooting mode ("NO" in the step S404), the mirror-reversal is performed, and the backlight 111 is lighted up (step S406). Then, the process returns the step S401.

When in the step S403, the LCD panel 110 is not in the "facing position", that is, when the LCD panel 110 is in the "front-facing position" (the determination result is "YES"), it is determined whether or not the shooting mode is the in-water shooting mode (step S407). When the shooting mode is the in-water shooting mode ("YES" in the step S407), the backlight 111 of the LCD 110 is turned off (step S408), and then the process returns to the step S401. On the other hand, when the shooting mode is not the in-water shooting mode, that is, when the shooting mode is a non in-water shooting mode ("NO" in the step S407), shooting is terminated, and the shooting mode is switched into a standby mode which is the third operation mode (step S409).

A description will now be given of characteristics of the operation control described above. The user generally takes pictures with the LCD panel 110 being in the "front-facing position" and the "opened position", and in the in-water shooting mode in which the DVC 100 is used in an environment susceptible to water streams or the like, the LCD panel 110 may be unintentionally moved from the "opened position" to the "closed position". For this reason, when the LCD panel 110 is brought into the "facing position" and the "closed position" in the in-water shooting mode, this is regarded as an operation unintended by the user, and shooting is continued (step S408). At this time, in the first embodiment, the backlight 111 is turned off to conserve power, but the backlight 111 should not always be turned off.

On the other hand, when the LCD panel 110 is brought into the "closed position" and the "front-facing position" in the non in-water shooting mode, this is regarded as an operation intended by the user, and shooting is terminated, and the DVC 100 is switched into the standby mode (step S409).

On the other hand, there is a need for switching to the standby mode according to the position of the LCD panel 110 during usage in the in-water shooting mode. For example, when the DVC 100 is used in water or near water such as snorkeling, the user wears gloves in many cases so as to protect his/her body, and hence it may be difficult to operate small operation buttons. In such a situation, if the DVC 100 can be switched into the standby mode by operation of the LCD panel 110, this will be convenient. Thus, in the first embodiment, when the LCD panel 110 is brought into the "facing position" and the "closed position", shooting is terminated, and the DVC 100 is switched into the standby mode (step S405). It should be noted that such control may be dispensed with, and even when the LCD panel 110 is brought into the "facing position" and the "closed position" in the in-water shooting mode (that is, in the step S405), shooting may be continued.

In contrast, in the case of the non in-water shooting mode, the "facing position" and the "closed position" are used for the purpose of reproducing images in many cases, and less likely to be used in reproducing images in the in-water shooting mode. Thus, when the LCD panel 110 is brought into the "facing position" and the "closed position" in the non in-water shooting mode, the mirror-reversal is performed, and the backlight 111 is lighted up (step S406).

Shooting with the LCD panel 110 in the "facing position" and the "closed position" is typically used for taking pictures of people. In contrast, subjects in the in-water shooting mode are thought to be people or living things in water and on water in many cases, and the frequency of use in the in-water shooting mode is thought to be lower than the frequency of use in the non in-water shooting mode. Thus, in the in-water shooting mode, to prevent shooting from being terminated due to the LCD panel 110 being unintentionally closed while shooting is performed with the LCD panel 110 being in the "facing position" and the "opened position", the backlight 111 is turned off in the step S412, and the user is advised not to perform shooting in this state.

As described above, according to the first embodiment, even when the LCD panel 110 is unintentionally closed during shooting in the in-water shooting mode, shooting does not end in failure, and moreover, shooting can be suspended by operation of the LCD panel 110 so that the DVC 100 can go standby. It should be noted that although in the step S412, the user is informed of usage in this state being not recommended by turning off the backlight 111, the present invention is not limited to this, but a warning message may be displayed on the LCD panel 110.

In the first embodiment, operation control is provided by using the shooting mode and the position of the LCD panel 110 in combination, but in a second embodiment, operation is controlled with consideration given to the time at which the position of the LCD panel 110 changes. Moreover, in the first embodiment described above, an environment that causes the LCD panel 110 to be unintentionally closed due to a water stream is taken as an example, but in the second embodiment, an environment that causes the LCD panel 110 to be unintentionally closed due to a strong wind (wind gust) is taken as an example. It should be noted that parts in the second embodiment corresponding to those in the first embodiment are noted as such, and description thereof is omitted.

The DVC 100 is configured so that its wind cutting function can be turned on and off by the user operating the console 120. The wind cutting function filters out low-frequency components not more than about 100 Hz in sound collection signals (sound signal) detected by the microphones so as to prevent indistinct sound (noise) from being recorded due to the microphones being exposed to a strong wind. In a shooting mode where the wind cutting function is on (wind cut shooting mode (fist shooting mode)), the system controller 130 constantly compares sound collection signals detected by the microphones 151 and 152. When a level difference between low-frequency components exceeds a threshold value, the system controller 130 determines the DVC 100 is exposed to a strong wind, and filters at least one of the microphones 151 and 152.

In the second embodiment, it is assumed that the DVC 100 is set in the wind cut shooting mode and used in an environment where the LCD panel 110 may close under the influence of a strong wind. In a shooting mode in which the wind cutting function is off (non wind cut shooting mode (second shooting mode)), it is assumed that the DVC 100 is used in an environment where the LCD panel 110 is not expected to close due to a strong wind.

Figure 5A:
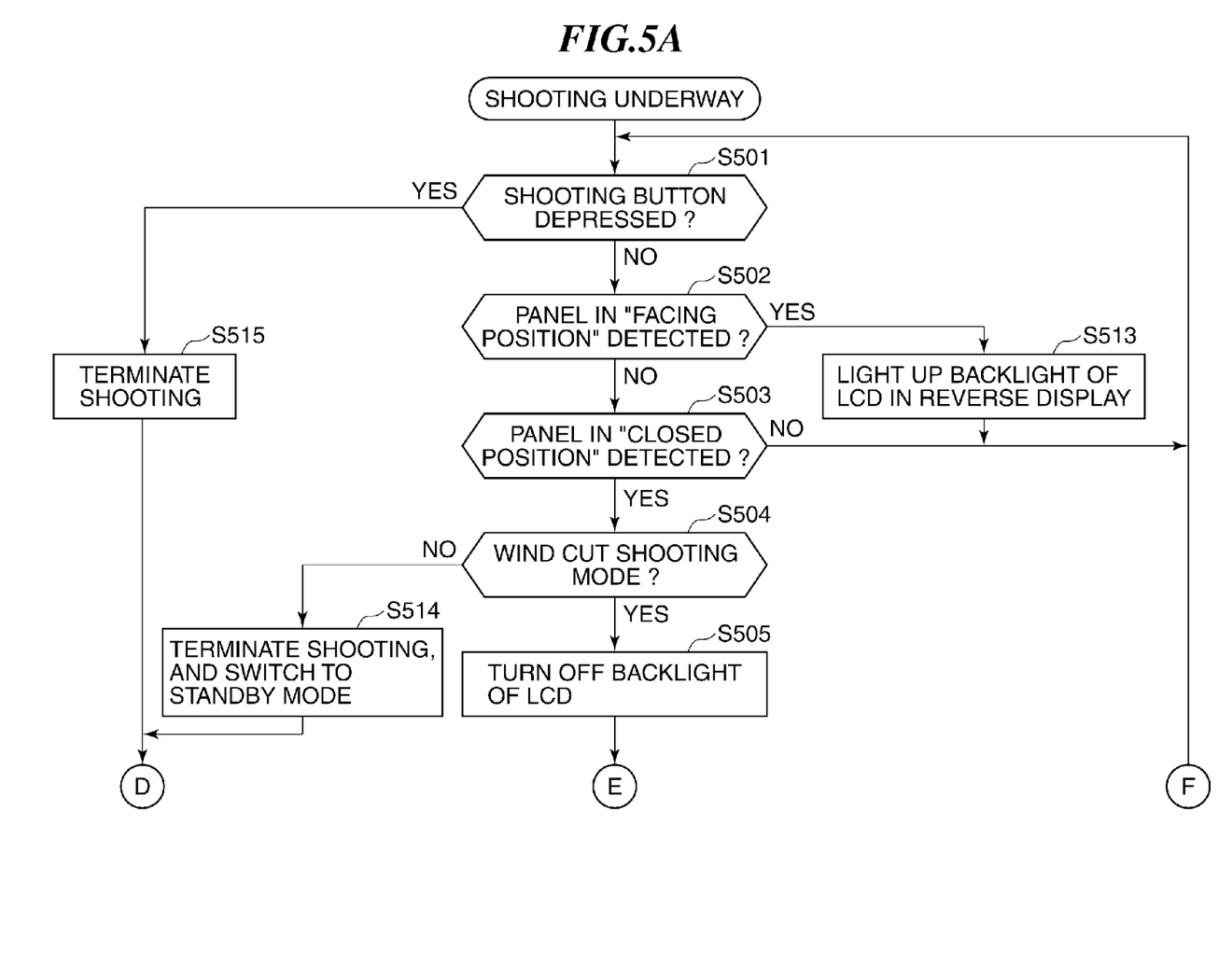
FIGS. 5A and 5B are flowcharts of operation control according to a second embodiment which is performed in the digital video camera in FIG. 1.
Figure 5B:
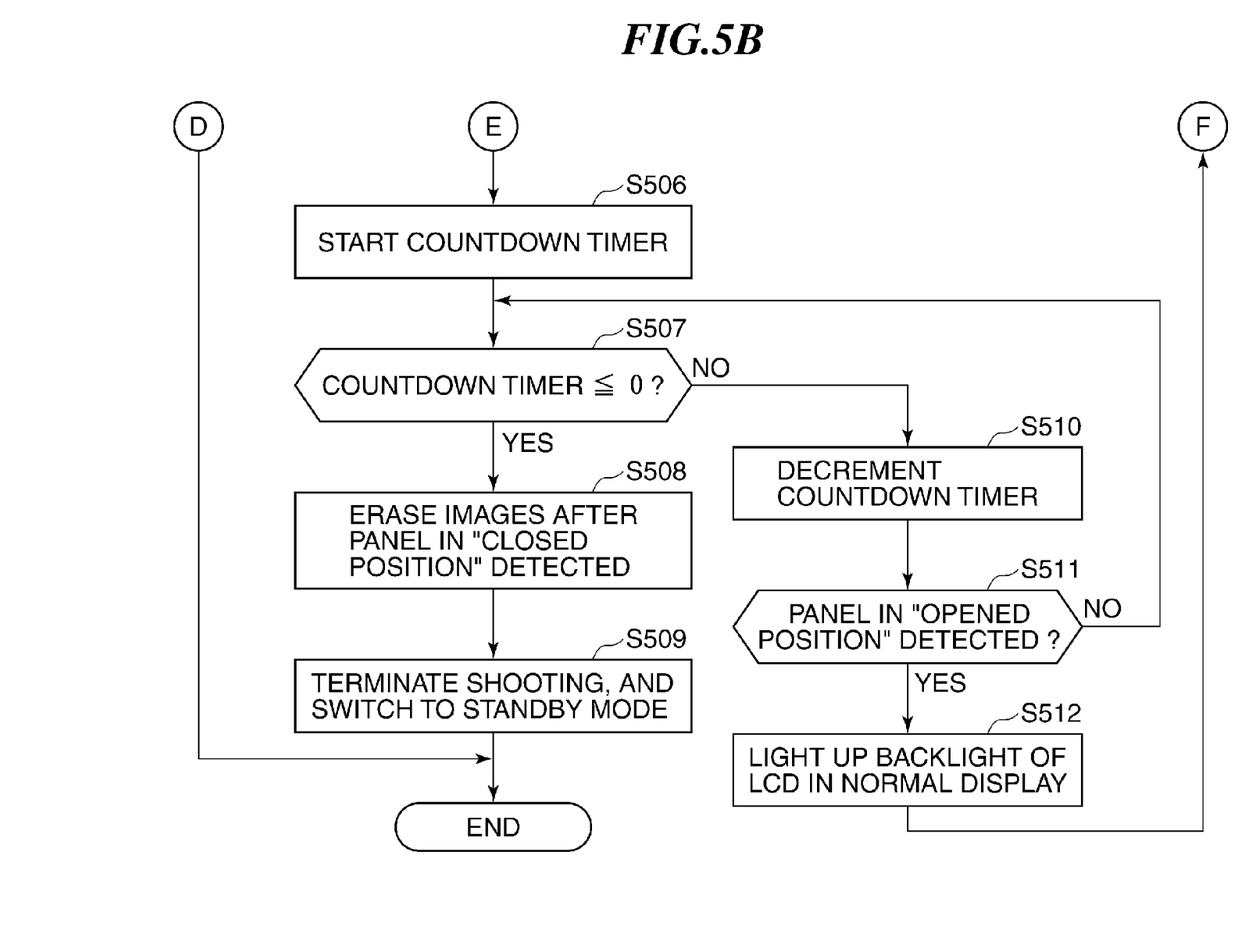

FIGS. 5A and 5B are flowcharts of operation control according to the second embodiment which is performed in the DVC 100. It is determined whether or not the shooting button has been depressed during shooting by the DVC 100

(step S501). When depression of the shooting button has been detected ("YES" in the step S501), this is determined as being a shooting terminating operation, and shooting is terminated (step S515). When depression of the shooting button has not been detected during shooting ("NO" in the step S501), the state of the rotation detection switch 122 is checked to determine whether or not the LCD panel 110 in the "facing position" (step S502).

When the LCD panel 110 is in the "facing position" ("YES" in the step S502), the mirror-reversal is performed, and the backlight 111 is lighted up (step S513). Then, the process returns to the step S501. When the LCD panel 110 is not in the "facing position" ("NO" in the step S502), the state of the opening/closing detection switch 121 is checked to determine whether or not the LCD panel 110 in the "closed position" (step S503). When the LCD panel 110 is not in the "closed position" ("NO" in the step S503), the process returns to the step S501. When the LCD panel 110 is in the "closed position" ("YES" in the step S503), it is determined whether or not the shooting mode is the wind cut shooting mode (step S504).

When the shooting mode is not the wind cut shooting mode ("NO" in the step S504), the shooting mode is switched into the standby mode (step S514). When the shooting mode is the wind cut shooting mode ("YES" in the step S504), the backlight 111 is turned off (step S505), and further, a countdown timer is started (step S506). It should be noted that a set value (predetermined time period) of the countdown timer is determined in advance and stored in the ROM 180.

A time interval is measured to determine whether or not the predetermined time period has elapsed, that is, whether or not the countdown timer has reached zero (0) or less (step S507). When the countdown timer has not reached zero or less, that is, when the countdown timer assumes a positive value (No in the step S507), the countdown timer is decremented (step S510). After that, the state of the opening/closing detection switch 121 is checked to determine whether or not the LCD panel 110 has been brought into the "opened position" (step S511). When the LCD panel 110 has not been brought into the "opened position" ("NO" in the step S511), the process returns to the step S507. When the LCD panel 110 has been brought into the "closed position" ("YES" in the step S511), the backlight 111 is lighted up in normal display (step S512), and then the process returns to the step S501.

When in the step S507, it is detected that the countdown timer has reached zero or less (the determination result is "YES"), shot images taken after the step S503 in which the LCD panel 110 being in the "closed position" is detected are erased (step S508). After that, shooting is terminated, and the shooting mode is switched into the standby mode (step S509).

A description will now be given of characteristics of the operation control described above. The user typically takes pictures with the DVC 100 being in the "front-facing position" and the "opened position", in the wind cut shooting mode used for an environment susceptible to a strong wind, the LCD panel 110 may be unintentionally moved from the "opened position" into the "closed position". Therefore, in the second embodiment, the wind cut shooting mode has a pending time period for which shooting is continued without immediately terminating shooting as long as the countdown timer is operating (the steps S507, S510, and S511). Thus, when noticing that the LCD panel 110 has been unintentionally closed within the pending time period, the user can continue shooting by manually putting the LCD panel 110 back into the "closed position".

On the other hand, when the countdown timer has reached zero or less, that is, when the opening/closing detection switch has not detected the "opened position" even after the end of the pending time period, the user determines that the LCD panel 110 has been closed as he/she intends, and thus terminates shooting. At this time, shot images taken after the LCD panel 110 is closed as he/she intends are not necessary, and hence the processing in the step S508 is performed. It should be noted that in the wind cut shooting mode, when it is determined that the LCD panel 110 is in the "front-facing position" and the "closed position", shooting is immediately terminated, and the shooting mode is switched into the standby mode in the step S514.

As described above, according to the second embodiment, even when the LCD panel 110 is unexpectedly closed during shooting in the wind cut shooting mode, shooting does not end in failure, and also, shooting can be suspended by operation of the LCD panel 110, and the DVC 100 can be switched into the standby mode. It should be noted that the set value of the countdown timer may be configured to be changeable via a menu screen by the user. It should be noted that although as an exemplary shooting mode in which the LCD panel 110 is likely to be unintentionally closed during shooting, the in-water shooting mode or the on-water shooting mode is taken in the first embodiment, and the wind cut shooting mode is taken in the second embodiment, the present invention is not limited to this. The present invention may be applied to a case where the in-water shooting mode in the first embodiment or the wind cut shooting mode in the second embodiment is replaced with any shooting mode in which the LCD panel 110 is likely to be unintentionally closed during shooting. For example, it is a matter of course that the process in the first embodiment may be applied to a case where the in-water shooting mode in the first embodiment is replaced with the wind cut shooting mode, and the process in the second embodiment may be applied to a case where the wind cut shooting mode in the second embodiment is replaced with the in-water shooting mode.

Moreover, as the shooting mode in which the possibility of the LCD panel 110 being unexpectedly closed is taken into consideration, the in-water shooting mode is set in the first embodiment, and the wind cut shooting mode is set in the second embodiment. However, it may be arranged such that the system controller 130 automatically switches shooting modes, and automatically determines whether or not the LCD panel 110 has been closed despite the user's intension. For example, in the second embodiment, even when the opening/closing detection switch 121 detects the "closed position" in the wind cut shooting mode, shooting is not immediately terminated as distinct from the non wind cut shooting mode.

However, it may be arranged such that whether or not to actually perform wind cutting processing may be additionally determined, and only when wind cutting processing is to be performed, an action different from that in the non wind cut shooting mode is taken (that is, the shooting mode is set at the wind cut shooting mode). Whether or not to actually perform wind cutting processing is determined by determining whether or not a level difference between sound collection signals (sound signals) detected by the microphones 151 and 152 is more than a predetermined value set in advance, and when the level difference becomes greater than the predetermined value, wind cutting processing is actually performed.

Moreover, when as a storage medium, an HDD (hard disk drive) is used in place of the memory card 141, it is preferred that a sensor for detecting drops is mounted on the DVC 100 so as to protect the HDD when, for example, the DVC 100 is dropped by mistake. In such a hardware arrangement, there may be a case where the LCD panel 110 is unintentionally closed due to air resistance or drop impact while a drop is being detected or within a predetermined period of time after a drop is detected.

Therefore, when the drop sensor detects a drop of the DVC 100, processing that does not immediately terminate shooting may be performed as an operation different from the non wind-cut shooting mode (that is, with the shooting mode set to the wind-cut shooting mode). It should be noted that the user may select and determine whether or not to use such a function.

Further, although in the above described embodiments, the present invention is applied to a digital video camera, the present invention is not limited to this, but may be applied to video shooting functions of a compact digital camera or a digital single-lens reflex camera having a vari-angle liquid crystal display. Also, the present invention may be applied to a cellular phone unit or game machine capable of taking moving images and having an openable and closable or sliding display unit which stops storage of moving images when closed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-141513 filed Jun. 22, 2010, which is hereby incorporated by reference herein in its entirety.

What is claimed is:

1. An image pickup apparatus comprising:
   an image pickup unit;
   a display unit configured to comprise a display having a display surface, and be mounted on a main body of the image pickup apparatus in such a manner as to be openable and closable;
   a detection unit configured to detect a position of said display unit with respect to the main body;
   a shooting mode setting unit configured to set any shooting mode from among a plurality of shooting modes including at least a first shooting mode and a second shooting mode; and
   a control unit configured to provide control to, during taking of moving images in the first shooting mode, stop the taking of the moving images when said detection unit detects said display unit being in a closed position with respect to the main body, and during taking of moving images in the second shooting mode, continue the taking of the moving images when said detection unit detects said display unit being in the closed position with respect to the main body.

2. An image pickup apparatus according to claim 1, wherein when during taking of moving images in the second shooting mode, said display unit is in the closed position, and the state of being in the closed position has continued for a predetermined time period or longer, said control unit provides control to stop the taking of the moving images.

3. An image pickup apparatus according to claim 2, wherein when during taking of moving images in the second shooting mode, said display unit is in the closed position, and the state of being in the closed position has continued for a predetermined time period or longer, control is provided to erase portions taken after aid detection units detects said display unit being in the closed position.

4. An image pickup apparatus according to claim 2, wherein when during taking of moving images in the second shooting mode, said display unit having been in the closed position switches to a state of being not in the closed position before the predetermined time period has elapsed, said control unit provides control to continue the taking of the moving images even after the predetermined time period has elapsed.

5. An image pickup apparatus according to claim 1, wherein when during taking of moving pictures in the second shooting mode, said detection unit detects that said display unit is in the closed position, and the display surface of said display unit faces the main body, said control unit provides control to continue the taking of the moving images, and when during taking of moving pictures in the second shooting mode, said detection unit detects that said display unit is in the closed position, and the display surface of said display unit does not face the main body, said control unit provides control to stop the taking of the moving images.

6. An image pickup apparatus according to any of claim 1, wherein the first shooting mode is a shooting mode in which shooting conditions predicated on shooting in water or shooting near water are set.

7. An image pickup apparatus according to claim 1, wherein the first shooting mode is a shooting mode in which noise generated by microphones hit by a strong wind among sound recorded by the microphones is reduced.

8. An image pickup apparatus according to claim 1, wherein said shooting mode setting unit automatically changes the shooting modes according to shooting conditions.

9. An image pickup apparatus according to claim 8, further comprising a drop detection unit configured to detect a drop of said image pickup unit,
   wherein when said drop detection unit detects a drop of said image pickup unit, said shooting mode setting unit sets the shooting mode to the second shooting mode.

10. A control method for an image pickup apparatus having an image pickup unit, a display unit that has a display having a display surface and is mounted on a main body of the image pickup apparatus in such a manner as to be openable and closable, and a detection unit that detects a position of the display unit with respect to the main body, comprising:
    a shooting mode setting step of setting any shooting mode from among a plurality of shooting modes including at least a first shooting mode and a second shooting mode; and
    a control step of providing control to, during taking of moving images in the first shooting mode, stop the taking of the moving images when the detection unit detects the display unit being in a closed position with respect to the main body, and during taking of moving images in the second shooting mode, continue the taking of the moving images when the detection unit detects the display unit being in the closed position with respect to the main body.

11. A non-transitory computer-readable storage medium storing a program for implementing a control method for an image pickup apparatus having an image pickup unit, a display unit that has a display with a display surface and is mounted on a main body of the image pickup apparatus in such a manner as to be openable and closable, and a detection unit that detects a position of the display unit with respect to the main body, the method comprising:
- a shooting mode setting step of setting any shooting mode from among a plurality of shooting modes including at least a first shooting mode and a second shooting mode; and
- a control step of providing control to, during taking of moving images in the first shooting mode, stop the taking of the moving images when the detection unit detects the display unit being in a closed position with respect to the main body, and during taking of moving images in the second shooting mode, continue the taking of the moving images when the detection unit detects the display unit being in the closed position with respect to the main body.

* * * * *